Oct. 24, 1950  C. C. H. RASMUSSEN  2,526,686
COOK POT STOVE

Filed March 24, 1945  2 Sheets-Sheet 1

INVENTOR.
Carl C. H. Rasmussen
BY
William F. Desmond
ATTORNEY

Oct. 24, 1950  C. C. H. RASMUSSEN  2,526,686
COOK POT STOVE
Filed March 24, 1945  2 Sheets-Sheet 2
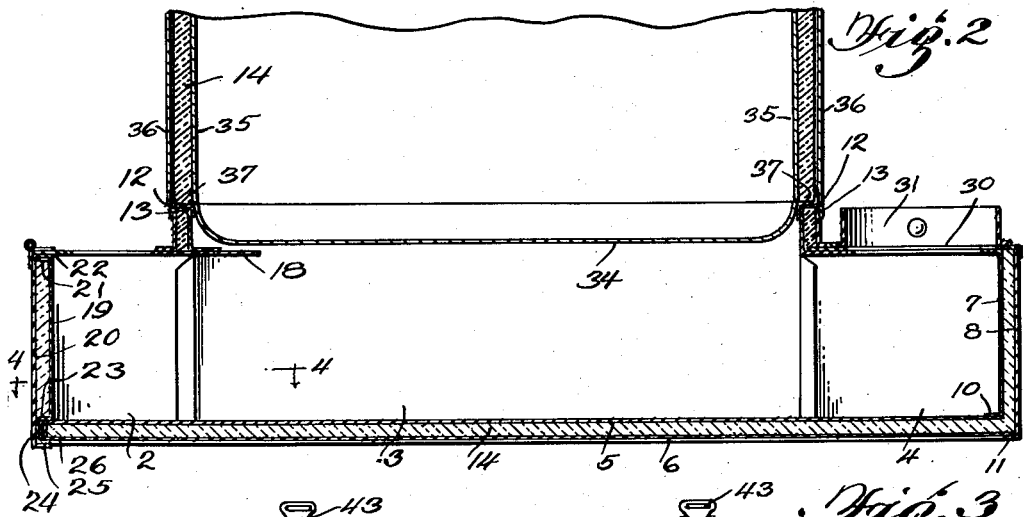
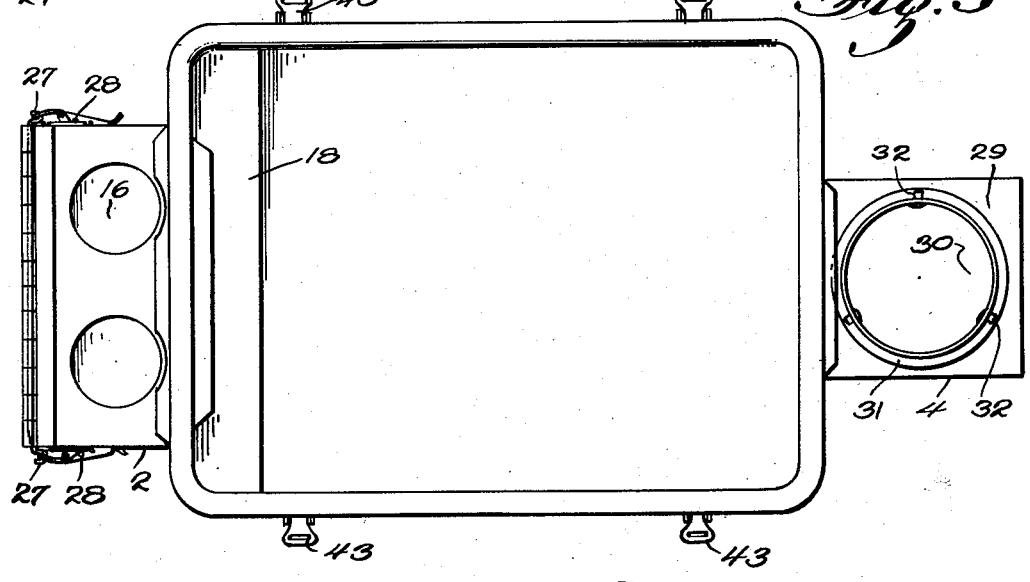
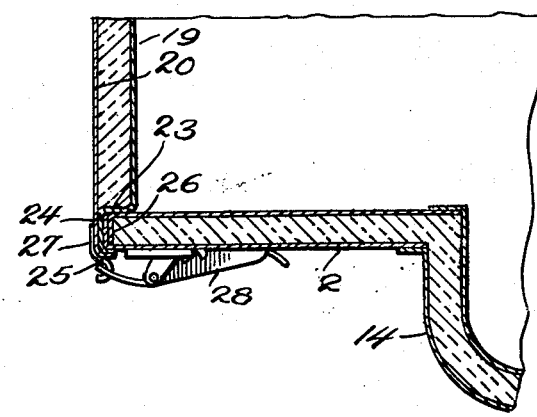
INVENTOR.
Carl C.H. Rasmussen
BY
William F. Diamond
ATTORNEY Patented Oct. 24, 1950

2,526,686

UNITED STATES PATENT OFFICE 2,526,686

COOK POT STOVE

Carl C. H. Rasmussen, Silver Spring, Md.

Application March 24, 1945, Serial No. 584,682

7 Claims. (Cl. 126—25)

(Granted under the act of March 3, 1883, as amended April 30, 1928; 370 O. G. 757)

The invention described herein, if patented may be manufactured and used by or for the Government for governmental purposes, without the payment to me of any royalty thereon.

This invention relates to cooking equipment, and more particularly to a combined cooking pot and stove for field use, especially adapted for cooking under emergency conditions with any available fuel, and for keeping food hot for long periods of time.

It is an object of the invention to provide a combination cooking pot and stove which can be easily assembled into a compact unit convenient for transportation and occupying a minimum of space in storage.

A further object of the invention is the provision of a cooking stove capable of utilizing any available type of fuel, and constructed to efficiently use and conserve the heat therefrom.

Another object of the invention is to provide cooking equipment especially adapted for use under emergency conditions, whereby suspension of cooking is unnecessary and food can be kept hot at all times should it be necessary to transport the equipment from one location to another.

Still further objects of the invention are the provision of cooking equipment of simple and rugged construction, designed to withstand the rough usage to which such equipment is likely to be subjected in use.

The cooking equipment, in accordance with the invention, comprises a stove having a burner box, a heating compartment, and a smoke box, all combined in an integral structure having insulated side walls and bottom. To this heating section is fitted a cooking pot having insulated side walls, and a lid capable also of use as a cooking utensil. Burners and a collapsible stove pipe are provided, and the entire equipment is adapted for assembly into a single compact unit for quick and convenient storage or transportation.

Figure 1:
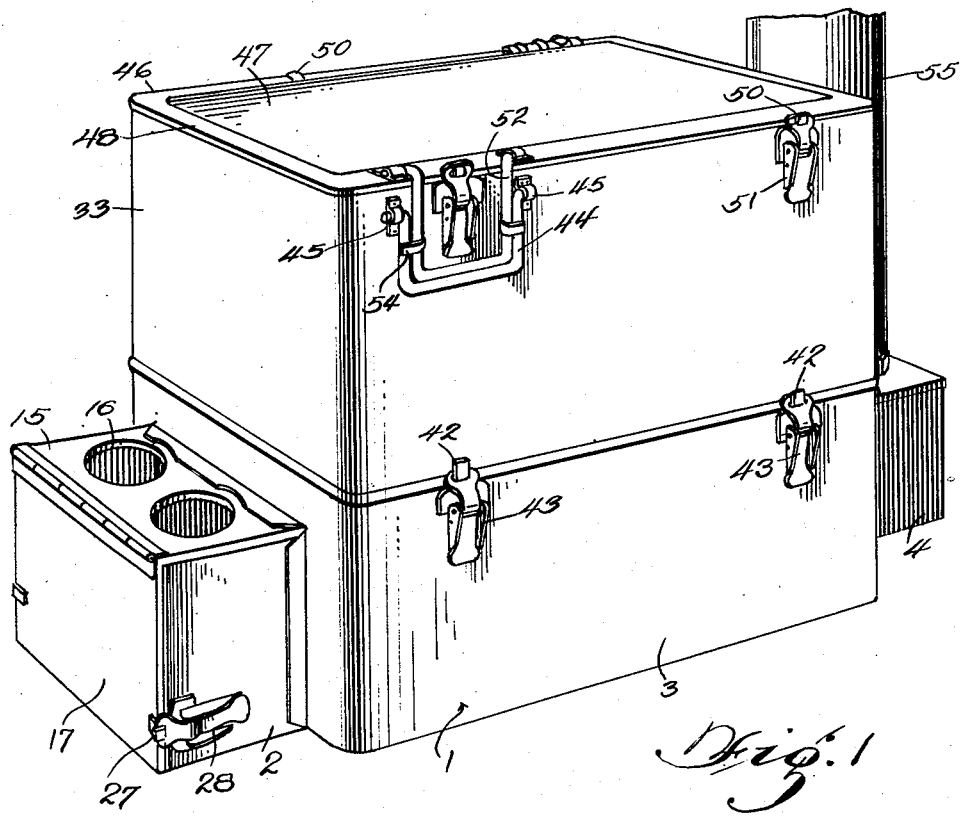
Figure 5:
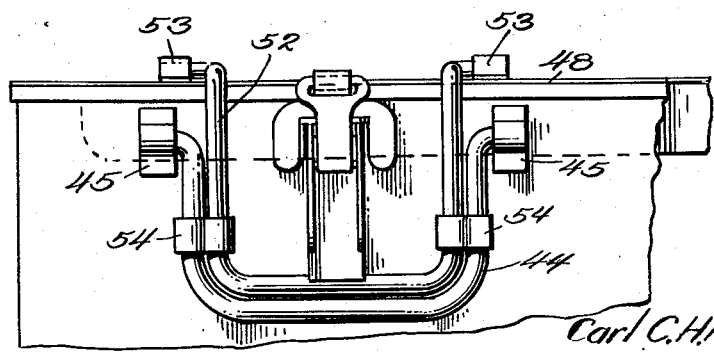

The construction, operation and advantages of the invention will be understood from the description given in the following specification and the accompanying drawings in which:

Fig. 1 is a perspective view showing the cooking equipment set up for operation; Fig. 2 is a longitudinal section of the stove shown in elevation; Fig. 3 is a plan view of the stove; Fig. 4 is an enlarged sectional plan view of a side portion of the burner box showing a portion of the door thereof and the method of attachment of the burner box to the heating compartment of the stove; Fig. 5 is an enlarged view of a portion of the top of the cooking pot and the cover thereof illustrating the construction and arrangement of the handles and securing means thereon.

As shown in Figs. 1, 2 and 3, the cooking equipment consists of the stove, indicated generally by the numeral 1, having the burner box 2, heating compartment 3, and the smoke pipe supporting box 4, all formed as an integral structure having insulated side and bottom walls.

The heating compartment 3 is formed of inner and outer shells of sheet metal having bottoms 5 and 6, inner side sheets 7 and outer side sheets 8. As seen in Fig. 2, the inner side sheets 7 have their lower marginal portion 10 turned in and lying along the top marginal portions of the inner bottom 5. The outer side sheets 8 have marginal portions 11 turned in and lying along and beneath the outer bottom 6. At the top the walls of the heating compartment have the inner side sheets 7 turned outwardly as at 12 and downwardly as at 13 to overlie the outer side sheets 8, forming a smooth top edge all around. The top of the heating compartment 3 is open. A horizontal baffle plate 18 extends inwardly of the heating compartment at the height of the top of the burner box 2 and adjacent thereto. Insulating material 14 such as asbestos is contained between the inner and outer sheets.

The burner box 2 has similarly constructed insulated sides and bottom and opens at one side into the heating compartment 3. The top of the burner box is uninsulated, formed of a single sheet 15, and has the circular openings 16 for the insertion of gasoline burners into the burner box. A sheet metal insulated door 17 is hingedly secured along its top edge to the top of the burner box. The door 17 has inner and outer sheets 19 and 20, the inner sheet 19 being turned outwardly along its top as at 21 to underlie the inturned portion 22 along the top of the outer sheet 20, the portions 21 and 22 being welded together. The inner sheet 19 is bent at right angles to its body portion along its side and bottom margins forming portions 23, and rebent at right angles to the portions 23 forming the portions 24 lying along the side and bottom margins of the outer sheet 20. The side and bottom margins of the sheets 19 and 20 thus combined are bent to form the lip 25. When the door 17 is closed the edges of the sides and bottom walls of the burner box are received in the recess 26 formed by the portions 23 and 25 of the door, as best seen in Fig. 4, assuring a close fit of the same. Hook shaped keepers 27 are secured to the outside of the door 17 which cooperate with draw bolts 28 attached to the sides of the burner box to secure the door in closed position.

The smoke pipe supporting box 4 is formed with insulated sides and bottom similar to those of the heating compartment 3 and opens at one side into that compartment. The top 29 of the smoke pipe supporting box 4 is uninsulated and has the circular opening 30 therein bordered by the smoke pipe attaching collar 31 having lugs 32 projecting outwardly from its periphery.

The cook pot 33 is formed of sheet metal and has the dished bottom 34, inner side wall 35 and outer side wall 36 seen in Fig. 2. The inner and outer side walls are joined near the bottom of the cooking pot by a Z-shaped member 37 whose web seats on the rim 12 of the heating compartment 3 when the pot is in position on the stove. The space between the inner sheet 35 and the outer sheet 36 is filled with insulating material 14. The insulated walls of the pot and the heating compartment are in alignment when the pot is seated on the stove, so that the insulation extends substantially continuously about the sides and bottom of the entire unit.

Hooks 42 are provided on the lower margin of the outer sheet 38 of the cook pot 33 which cooperate with the draw bolts 43 attached to the outer sheets 8 of the heating compartment 3 for securing the pot in seated position on the heating compartment. Loop handles 44 are pivoted in clips 45 secured to the upper margin of the outer sheet 38 of the pot 33.

The cover 46 of the cook pot 33 is of sheet metal having its central portion dished as at 47. The marginal portion of the cover 46 forms a flat rim 48 for contact with the top edge of the pot. The cover 46 is adapted to be used as a frying pan and for that purpose can be seated on top of the heating compartment 3, completely covering the opening therein. Hooks 50 are secured to the upper surface of the rim 48 for cooperation with draw bolts 51 on the pot for securing the cover 46 thereon. The cover may also be held in position on the heating compartment by the cooperation of the hooks 50 with the draw bolts 43.

As shown in Fig. 5, handles 52 are secured to the cover 46 by clips 53 attached to the rim 48. These handles 52 are bent to overlie the side of the cooking pot 33 when in downward position, and are proportioned to fit inside the loop handles 44 of the cooking pot 33. The handles 52 have projecting pieces 54 secured to their sides which overlie the sides of the loop handles 44 for a purpose later to be explained.

A smoke pipe 55 is provided which may be formed in nesting sections for convenient storing in the stove 1 when not in use. The lowermost section of the smoke pipe is provided with a collar having slots for engaging the lugs 32 on the smoke pipe attaching collar 31 forming a connection of the well-known bayonet type.

The spaces within the stove and inside the cooking pot are used to accommodate burners (not shown) used with the stove, the nested stove pipe sections, and such other equipment as the spaces thus afforded will permit. The entire equipment can thus be assembled into a single compact unit for convenient carrying.

Burners for use with the cooking equipment can be of any suitable type and to burn any kind of fuel, but are preferably gasoline burners adapted for insertion in the openings 16 in the top of the burner box 2.

In use, assuming that the cooking equipment has been assembled, the pot 33 is removed from the stove by releasing the draw bolts 43 thereon from the hooks 42 on the pot, and lifting the pot from the stove by handles 44 and 52. If suitable fuel is available for their use, the burners carried in the stove are inserted through the opening 16 in the burner box 2. Should it be desired to use wood or other fuel, the door 17 is opened and the fire built directly on the inner bottom 5 of the heating compartment. The nested smoke pipe sections are assembled and the smoke pipe attached to the smoke pipe supporting box 4. The cooking pot 33 or the cover 46 is then placed on top of the heating compartment 3 and the equipment is in condition to begin the cooking operations.

By reason of the alignment of the walls of the stove and the cooking pot, the insulating material extends substantially continuously around the sides and bottom of the entire unit and the heat is effectively confined and efficiently utilized in the cooking operation, resulting in economy of fuel and quicker and more thorough cooking of the food. Should it become necessary to change the location of the cooking equipment while the cooking is in progress, or to transport the cooked food any substantial distance while keeping it hot, the entire unit can be picked up by the handles 44 and 52 and carried where desired in any suitable manner. The insulated bottom and sides of the stove and the close fitting insulated door 17 of the same effectually prevent injury to the surroundings by the heat of the stove, so that it is unnecessary to extinguish the fire therein when transporting the equipment from one place to another. The circular openings 16, due to their location in the top of the burner box, serve to admit the downward draft of air to the stove without permitting the escape in the fire therefrom.

The pot 33, when uncovered, can be carried by the handles 44 alone, or if the cover 46 is placed in position and fastened by the draw bolts 51 cooperating with the hooks 50, the handles 52 will give additional support in carrying the pot. Thus when the handles 44 of the pot 33 are raised with the cover 46 in position, the projecting pieces 54 contact the sides of the handles 52 so that these handles are also raised and with the handles 44 assist in lifting the pot.

It will thus be apparent that the invention provides portable cooking equipment capable of being operated under varied circumstances and conditions, which will give efficient service with any available fuel, and which can be assembled and handled with facility and safety.

Having thus clearly described and illustrated the invention, what is claimed and desired to secure by Letters Patent is:

1. A portable cooking unit comprising a heating compartment having thermal insulating bottom and side walls and an open top, said compartment forming a passageway for hot gases of combustion and said open top providing a relatively large heat exchange area, a burner-box integral with one end of said heating compartment and communicating therewith, a smoke-box integral with the opposite end of said heating compartment and communicating therewith at a point horizontally spaced from said burner-box over substantially the entire length of said heating compartment to secure maximum horizontal passage of hot gases of combustion through said heating compartment, and a cooking compartment adapted to be seated on said heating compartment with its bottom wall extending over the open top therein and its side walls extending above the side walls of said heating compartment in vertical alignment therewith.

2. A portable cooking unit comprising a heating compartment having thermal insulating bottom and side walls and an open top, said compartment forming a passageway for hot gases of combustion and said open top providing a relatively large heat exchange area, a burner-box integral with one end of said heating compartment and communicating therewith, a smoke-box integral with the opposite end of said heating compartment and communicating therewith at a point horizontally spaced from said burner-box over substantially the entire length of said heating compartment to secure maximum horizontal passage of hot gases of combustion through said heating compartment, and a cooking compartment adapted to be seated on said heating compartment with its bottom wall extending over the open top therein, said cooking compartment having thermal insulating side walls in vertical alignment with the side walls of said heating compartment when said compartments are positioned in assembled relation.

3. A portable cooking unit comprising a heating compartment having thermal insulating bottom and side walls and an open top, said compartment forming a passageway for hot gases of combustion and said open top providing a relatively large heat exchange area, a burner-box integral with said heating compartment and communicating therewith, a smoke-box integral with said heating compartment and communicating therewith at a point removed from said burner-box to secure maximum passage of hot gases of combustion through said heating compartment, a cooking compartment adapted to be seated on said heating compartment with its bottom wall extending over the open top therein, said cooking compartment having side walls in vertical alignment with the side walls of said heating compartment, and means for sealing the juncture between said cooking compartment and said heating compartment.

4. A portable cooking unit comprising a heating compartment having thermal insulating bottom and side walls and an open top, said compartment forming a passageway for hot gases of combustion and said open top providing a relatively large heat exchange area, a burner-box integral with one end of said heating compartment and communicating therewith, a smoke-box integral with the opposite end of said heating compartment and communicating therewith at a point horizontally spaced from said burner-box over substantially the entire length of said heating compartment to secure maximum horizontal passage of hot gases of combustion through said heating compartment, a cooking compartment adapted to be seated on said heating compartment with its bottom wall extending over the open top therein, said cooking compartment having side walls in vertical alignment with the side walls of said heating compartment, and a horizontally extending baffle plate on said heating compartment proximate said burner-box for directing hot gases of combustion from said burner-box through said heating compartment towards said smoke-box.

5. A portable cooking unit comprising a heating compartment having thermal insulating bottom and side walls and an open top, said compartment forming a passageway for hot gases of combustion and said open top providing a relatively large heat exchange area, a burner-box integral with said heating compartment and communicating therewith, a smoke-box integral with said heating compartment and communicating therewith at a point removed from said burner-box to secure maximum passage of hot gases of combustion through said heating compartment, a cooking compartment adapted to be seated on said heating compartment with its bottom wall extending over the open top therein, said cooking compartment having thermal insulating side walls in alignment with the side walls of said heating compartment when said compartments are positioned in assembled relation, a removable top for said cooking compartment, means for releasably locking said compartments in assembled relation and means for releasably locking said top on said cooking compartment.

6. A portable cooking unit comprising a heating compartment through which hot gases of combustion flow, said compartment having integral thermal insulating bottom and side walls and an open top, a burner-box integral with said heating compartment and communicating therewith, a smoke-box integral with said heating compartment and communicating therewith at a point removed from said burner-box, a cooking compartment adapted removably to seat upon said heating compartment, said cooking compartment having a thermal conducting bottom adapted to extend over said open top and thermal insulating side walls in alignment with the side walls of said heating compartment when said compartments are positioned in assembled relation, a removable thermally conducting top for said cooking compartment, said top being adapted to seat on the upper edges of said heating compartment when the cooking compartment is removed therefrom, means for releasably locking said top on said cooking compartment and means for releasably locking said compartments together, said means being adapted to lock said top on said heating compartment when said top is seated thereon.

7. A portable cooking unit comprising a heating compartment through which hot gases of combustion flow, said compartment having integral thermal insulating bottom and side walls and an open top, a burner-box integral with said heating compartment and communicating therewith, a smoke-box integral with said heating compartment and communicating therewith at a point removed from said burner-box, a cooking compartment adapted removably to seat upon said heating compartment, said cooking compartment having a thermal conducting bottom adapted to extend over said open top and thermal insulating side walls in alignment with the side walls of said heating compartment when said compartments are positioned in assembled relation, and a removable thermally conducting top for said cooking compartment, a perimetrical flange on said top adapted to seat upon the upper edges of the side walls of said cooking compartment, said flange also being adapted to seat upon the edges of the open top of said heating compartment to form a cooking pan when said cooking compartment is removed from said heating compartment.

CARL C. H. RASMUSSEN.

REFERENCES CITED

The following references are of record in the file of this patent:

UNITED STATES PATENTS

| Number | Name | Date |
|---|---|---|
| 130,228 | Lovell | Aug. 6, 1872 |
| 145,491 | Dibble | Dec. 16, 1873 |
| 523,920 | Sinclair | July 31, 1894 |
| 674,907 | Dowell | May 28, 1901 |
| 834,222 | Blanchard | Oct. 23, 1906 |
| 860,466 | Hatcher et al. | July 16, 1907 |
| 1,040,451 | Stockton | Oct. 8, 1912 |
| 1,423,961 | Murphy | July 25, 1922 |
| 2,064,101 | Berry | Dec. 15, 1936 |
| 2,154,305 | Goerl | Apr. 11, 1939 |

FOREIGN PATENTS

| Number | Country | Date |
|---|---|---|
| 15,116 | Great Britain | June 23, 1910 |
| 23,966 | Austria | Apr. 25, 1906 |
| 614,479 | Germany | May 28, 1933 |